US012768852B2

(12) United States Patent
Okabe et al.

(10) Patent No.: US 12,768,852 B2
(45) Date of Patent: Oct. 20, 2026

(54) AUTOMATIC ANALYZER

(71) Applicant: HITACHI HIGH-TECH CORPORATION, Tokyo (JP)

(72) Inventors: Shugo Okabe, Tokyo (JP); Takenori Okusa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 663 days.

(21) Appl. No.: 18/254,033

(22) PCT Filed: Nov. 8, 2021

(86) PCT No.: PCT/JP2021/040961
§ 371 (c)(1),
(2) Date: May 23, 2023

(87) PCT Pub. No.: WO2022/130826
PCT Pub. Date: Jun. 23, 2022

(65) Prior Publication Data

US 2023/0417783 A1 Dec. 28, 2023

(30) Foreign Application Priority Data

Dec. 17, 2020 (JP) ................................ 2020-208931

(51) Int. Cl.
*G01N 35/04* (2006.01)
*G01N 35/00* (2006.01)
*G01N 35/02* (2006.01)

(52) U.S. Cl.
CPC ........... *G01N 35/04* (2013.01); *G01N 35/025* (2013.01); *G01N 2035/00346* (2013.01); *G01N 2035/0401* (2013.01)

(58) Field of Classification Search
CPC ................ G01N 35/04; G01N 35/025; G01N 2035/00346; G01N 2035/0401
See application file for complete search history.

(56) References Cited

U.S. PATENT DOCUMENTS 5,320,808 A 6/1994 Holen et al.
5,807,523 A 9/1998 Watts et al.
(Continued)

FOREIGN PATENT DOCUMENTS

JP H02-78959 A 3/1990
JP H09-72921 A 3/1997
(Continued)

OTHER PUBLICATIONS

Extended European Search Report, mailed Oct. 16, 2024, for European Application No. 21906190.0.
(Continued)

*Primary Examiner* — P. Kathryn Wright
*Assistant Examiner* — Alex Ramirez
(74) *Attorney, Agent, or Firm* — Baker Botts L.L.P

(57) ABSTRACT

An automatic analyzer comprises a reagent storage unit, a reaction promotion unit, and an unused container providing unit. The reaction promotion unit is between the reagent storage unit and the unused container providing unit in a left-right direction, and is on a rear side from the reagent storage unit and the unused container providing unit in a front-rear direction. In the automatic analyzer, a cover covering the reaction promotion unit is with a first fitting portion, a second fitting portion, and a third fitting portion located between the first and the second fitting portion in the left-right direction and a handle that is between the first and the second fitting portion in the left-right direction and on a rear side of the third fitting portion in the front-rear direction. The first and the second fitting portion are high in positioning functionality. The third fitting portion is low in positioning functionality.

6 Claims, 3 Drawing Sheets

(56) References Cited

U.S. PATENT DOCUMENTS

| | | | | |
|---|---|---|---|---|
| 6,440,369 | B1 * | 8/2002 | Oonuma .......... | G01N 35/00594 422/63 |
| 2009/0068062 | A1 | 3/2009 | Jafari et al. | |
| 2015/0226759 | A1 | 8/2015 | Connolly et al. | |
| 2018/0172715 | A1 | 6/2018 | Yamamoto et al. | |
| 2020/0241026 | A1 * | 7/2020 | Sakairi ............... | G01N 35/1002 |

FOREIGN PATENT DOCUMENTS

| | | | |
|---|---|---|---|
| JP | 2001-504577 | A | 4/2001 |
| JP | 2006-091030 | A | 4/2006 |
| JP | 2019-056660 | A | 4/2019 |

OTHER PUBLICATIONS

International Search Report, mailed Dec. 7, 2021, for International Application No. PCT/JP2021/040961.

* cited by examiner

AUTOMATIC ANALYZER

TECHNICAL FIELD

The present invention relates to an automatic analyzer.

BACKGROUND ART

Among units that constitute an automatic analyzer, a unit that stores a reagent container, a unit that stores a consumable such as an unused reaction container, and the like have a relatively high frequency of access by a user or the like. Here, PTL 1 discloses an automatic analyzer with a layout in which a reagent storage unit and a consumable storage unit are arranged on one side and the other side in a left-right direction, and a reaction promotion unit such as an incubator is arranged between these units and on a rear side of these units.

CITATION LIST

Patent Literature

PTL 1: JP2019-56660A

SUMMARY OF INVENTION

Technical Problem

The reaction promotion unit may be provided with a cover that covers above the reaction promotion unit, but in a case of an automatic analyzer with such a layout in PTL 1, a position of the cover is far from the user or the like compared that the reaction promotion unit is located on the rear side of the reagent storage unit and the like. In particular, when a handle formed on an upper surface of the cover is located on a front side of a fitting portion to be fitted to the reaction promotion unit, the fitting portion may be hidden by a hand or an arm gripping the handle, and it may be difficult to mount the cover.

An object of the invention is to provide an automatic analyzer improved in attachment workability of a cover covering above a reaction promotion unit.

Solution to Problem

In order to solve the above problem, the invention provides an automatic analyzer. The automatic analyzer includes a reagent storage unit, a reaction promotion unit, and an unused container providing unit. The reaction promotion unit is located between the reagent storage unit and the unused container providing unit in a left-right direction, and is located on a rear side from the reagent storage unit and the unused container providing unit in a front-rear direction. In the automatic analyzer, a cover covering above the reaction promotion unit is provided with a fitting portion including a first fitting portion, a second fitting portion, and a third fitting portion located between the first fitting portion and the second fitting portion in the left-right direction and a handle that is positioned between the first fitting portion and the second fitting portion in the left-right direction and on a rear side of the third fitting portion in the front-rear direction, and the first fitting portion and the second fitting portion are high in positioning functionality and the third fitting portion is low in positioning functionality.

Advantageous Effects of Invention

According to the invention, it is possible to provide an automatic analyzer improved in attachment workability of a cover covering above a reaction promotion unit.

DESCRIPTION OF EMBODIMENTS

As an embodiment of the invention, an immune analyzer that is an example of an automatic analyzer will be described.

Figure 1:
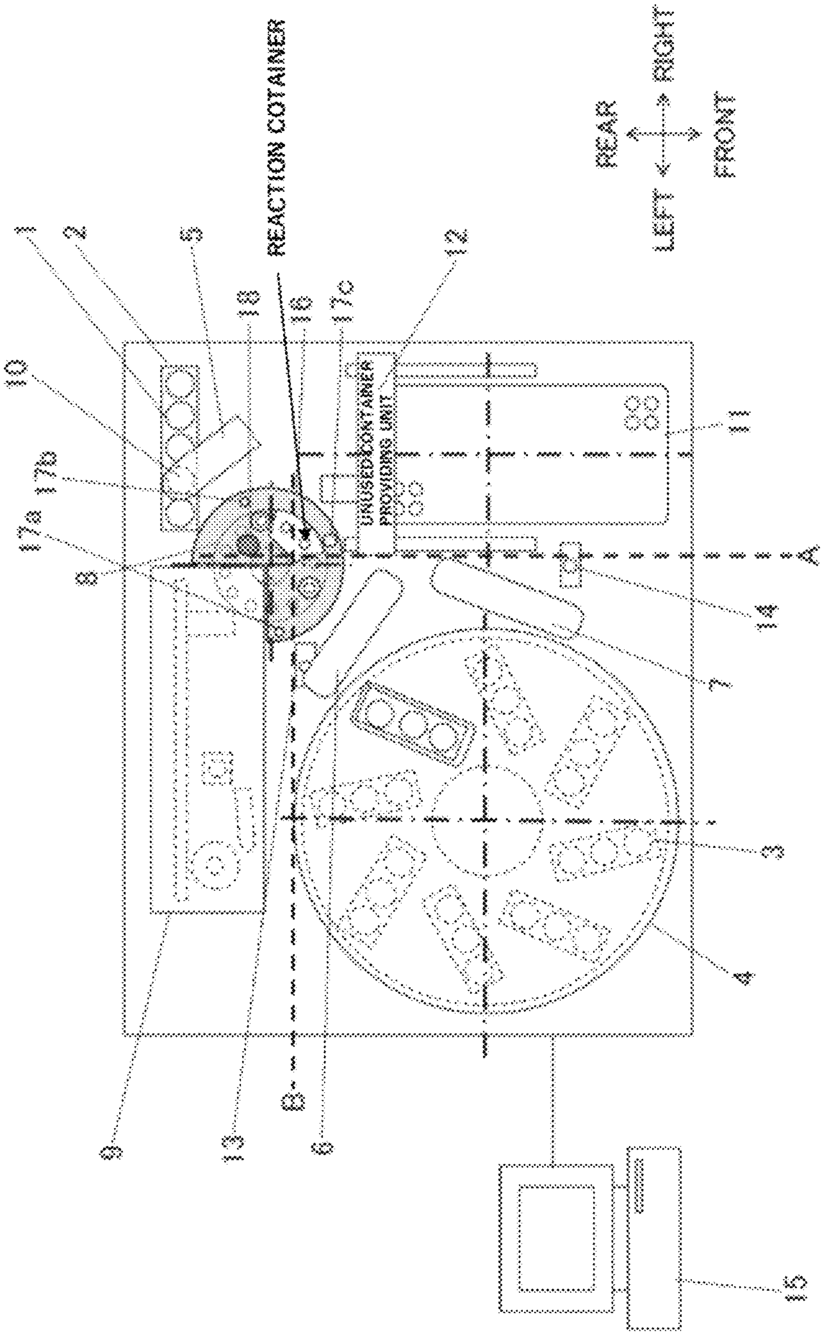
FIG. 1 is an entire configuration diagram showing an outline of an automatic analyzer.

FIG. 1 is an entire configuration diagram showing an outline of the automatic analyzer. As shown in FIG. 1, the automatic analyzer according to the present embodiment includes a sample conveyance unit 2 that conveys, to a sample aspiration position 10, a sample container 1 such as a blood collection tube in which a sample to be analyzed is accommodated, a reagent storage unit 4 that controls a temperature of a reagent container 3 containing a reagent to be used for an analysis such that a temperature of the reagent falls within a certain range, a sample dispensing unit 5 that dispenses the sample in the sample container 1 into a reaction container, a reagent dispensing unit 6 that dispenses the reagent in the reagent container 3 into the reaction container, a stirring unit 7 that stirs particles and the like in a liquid in the reagent container 3 whose top is open, a reaction promotion unit 8 (incubator) that installs the reaction container accommodating a reaction liquid in which the sample and the reagent are mixed and controls the reaction liquid to fall within a certain temperature range, a measurement unit 9 that optically measures an amount of a substance in the reaction liquid whose reaction is promoted by the reaction promotion unit 8, and a consumable providing unit (unused container providing unit) that stores a consumable and provides the consumable to the reaction promotion unit 8. Further, in order to measure a temperature of a surrounding environment in which the automatic analyzer is arranged, an environmental temperature measurement sensor (not shown) is arranged. These units are controlled by a control device 15.

The sample conveyance unit 2 is a sample rack on which one or more sample containers 1 are mounted, and may be a sample disk arranged on a circumference of the disk. In a case of the sample rack, the sample rack is conveyed to the sample aspiration position 10 in the sample dispensing unit 5 by a conveyance device such as a conveyance belt mechanism or a robot arm.

The reagent storage unit 4 has a configuration in which any reagent container 3 is conveyed to a desired position by arranging and rotating a plurality of reagent containers 3 on the circumference, or may have a configuration in which the reagent containers 3 are arranged in one row or in a plurality of rows vertically and horizontally.

The measurement unit 9 performs an optical measurement on the reaction liquid in a measurement flow path, and in this case, the reaction liquid in the flow path is measured in a state of being controlled within a certain temperature range. Examples of measurement operations include a measurement of absorbance of the reaction liquid, a measurement of a light emission amount when the reagent is added to the reaction liquid or a voltage is applied thereto, a measurement of the number of particles in the reaction liquid, and a measurement of a variation in a current value or a voltage value when the reaction liquid comes into contact with an electrode film. Therefore, in the measurement unit 9, a light measurement instrument such as a photomultiplier or a photometer, an imaging element such as a CCD, an ammeter or a voltmeter that measures a variation in a current value or in a voltage value, and the like are provided.

The sample dispensing unit 5 dispenses the sample in the sample container 1 into the reaction container, and it is necessary to consider an influence of carryover between the samples depending on an analysis performance required for the analyzer. Therefore, for a portion that comes into contact with the sample when the sample dispensing unit 5 dispenses the sample, an unused reaction container is used every time, or a dispensing tip that can be replaced every time the sample is changed is used. In this case, the reaction container or the dispensing tip used once is discarded. The reagent dispensing unit 6 and the stirring unit 7 also include a reagent dispensing probe cleaning unit 13 and a stirring rod cleaning unit 14 that clean a portion immersed in the reagent in consideration of the influence of carryover.

The consumable providing unit includes a consumable storage unit 11 that stores a new reaction container and a dispensing tip necessary for performing an analysis for a certain period of time, and a consumable conveyance unit 12 that appropriately conveys an unused reaction container or the like stored in the consumable storage unit 11 to a place where the unused reaction container or the like is to be used.

The reaction promotion unit 8 maintains a temperature of the reaction container within a predetermined temperature range, thereby allowing a stable reaction to proceed. Specifically, the reaction promotion unit 8 is an incubator that performs temperature control by heating a surrounding with a heater or the like in a state in which the plurality of reaction containers are arranged on the circumference. As another example of the reaction promotion unit 8, a thermostatic bath in which a reaction container is immersed in a bath in which a liquid controlled to a certain temperature range circulates may be used.

As shown in FIG. 1, the reagent storage unit 4 and the consumable providing unit are arranged on a left side and a right side in a left-right direction, respectively. Further, a central position of the reaction promotion unit 8 is located between a central position of the reagent storage unit 4 and a central position of the consumable providing unit in the left-right direction, and is located on a rear side from a central position of the reagent storage unit 4 and a central position of the consumable providing unit in a front-rear direction. In such a layout, since the reagent storage unit 4 and the consumable providing unit which are frequently used are positioned on a front side of the automatic analyzer, a user who operates on the front side can easily use the units.

Figure 2:
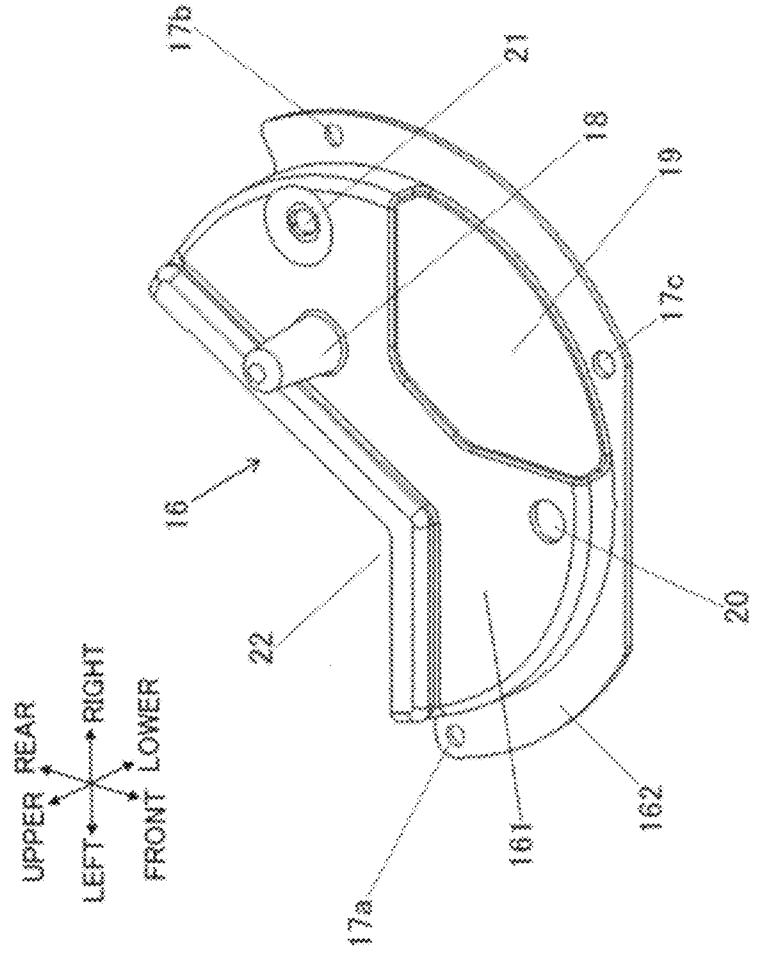
FIG. 2 is a perspective view showing an appearance of a reaction promotion unit cover.

Next, a configuration of a reaction promotion unit cover 16 that covers above the reaction promotion unit 8 will be described with reference to FIG. 2. FIG. 2 is a perspective view showing an appearance of the reaction promotion unit cover 16. As shown in FIG. 2, the reaction promotion unit cover 16 includes a central portion 161 that extends in a radial direction of the reaction promotion unit 8, and an edge portion 162 that extends in a circumferential direction on an outer side of the central portion 161. By mounting the reaction promotion unit cover 16 on the reaction promotion unit 8, it is possible to prevent water from the reagent dispensing probe cleaning unit 13 and the stirring rod cleaning unit 14 and surrounding dust from entering the reaction container placed in the reaction promotion unit 8. When the user cleans a surface of the reaction promotion unit 8, or when a serviceman adjusts a predetermined unit, or the like, the reaction promotion unit cover 16 is temporarily removed.

The edge portion 162 of the reaction promotion unit cover 16 is formed with a first hole 17*a* on a left side, a second hole 17*b* on a right side, and a third hole 17*c* between the first hole 17*a* and the second hole 17*b* in the left-right direction. Here, an area of the first hole 17*a* is the same as an area of the second hole 17*b*, but is smaller than an area of the third hole 17*c*. That is, when each hole is circular, a diameter of the third hole 17*c* is larger than diameters of the first hole 17*a* and the second hole 17*b*.

The central portion 161 of the reaction promotion unit cover 16 is formed with a handle 18 that extends upward to be gripped by the user or the serviceman, a hole for consumable conveyance 19 through which the consumable conveyance unit 12 accesses the reaction promotion unit 8, a hole for reagent dispensation 20 through which the reagent dispensing unit 6 accesses the reaction promotion unit 8, a hole for sample dispensation 21 through which the sample dispensing unit 5 accesses the reaction promotion unit 8, and a notch for measurement unit 22 that avoids contact with the measurement unit 9. The third hole 17*c* is positioned within a range of the hole for consumable conveyance 19 in the left-right direction and in front of the hole for consumable conveyance 19 in the front-rear direction.

The reaction promotion unit cover 16 is mounted on a rod-like member 30 that extends upward from below around the reaction promotion unit 8. In this case, the first hole 17*a* of the reaction promotion unit cover 16 is fitted into a convex portion of a first rod-like member 30*a*, the second hole 17*b* of the reaction promotion unit cover 16 is fitted into a convex portion of a second rod-like member 30*b*, and the third hole 17*c* of the reaction promotion unit cover 16 is fitted into a convex portion of a third rod-like member 30*c*.

Figure 3:
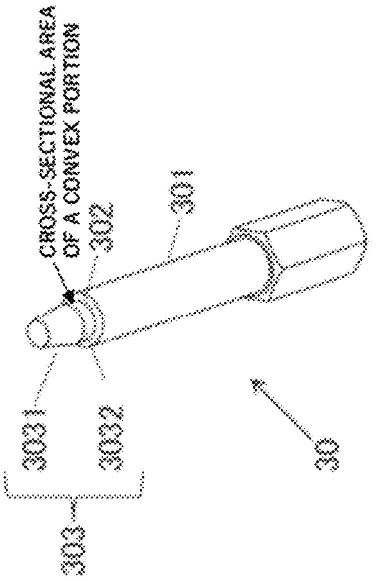
FIG. 3 is an enlarged view showing a configuration of a rod-like member.

FIG. 3 is an enlarged view showing a configuration of the rod-like member 30. In the present embodiment, since configurations (cross-sectional area, diameter, length, and the like) of the first rod-like member 30*a*, the second rod-like member 30*b*, and the third rod-like member 30*c* are all the same, manufacturing costs can be reduced. As shown in FIG. 3, the rod-like member 30 includes a large cylindrical portion 301 that forms a main body, a seating surface 302 formed at an upper end of the large cylindrical portion 301, and a convex portion 303 connected to the seating surface 302. Further, the convex portion 303 includes an inclined portion 3031 having a diameter increasing downward and a small cylindrical portion 3032 connected to a lower end of the inclined portion 3031.

Figure 4:
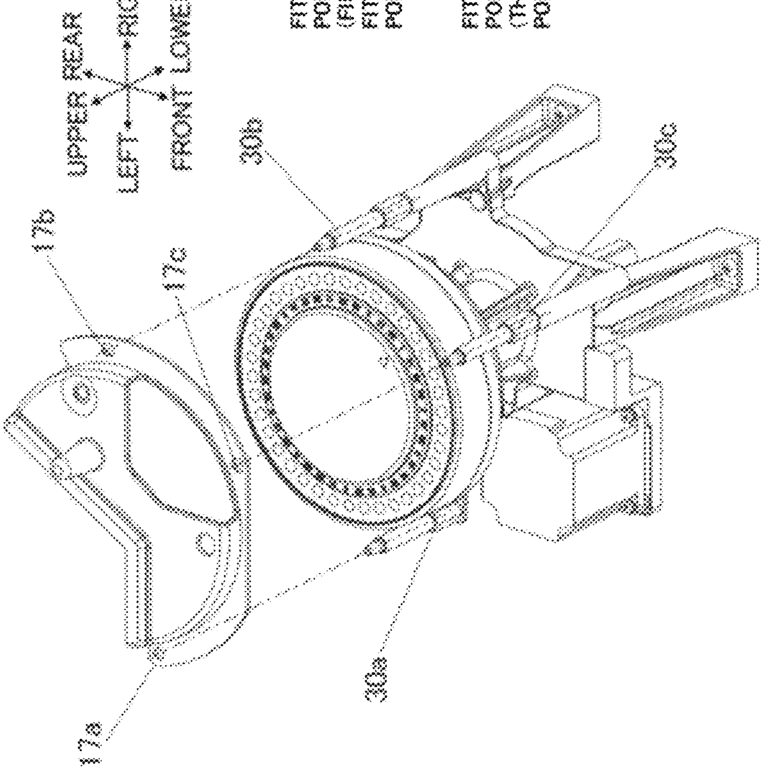
FIG. 4 is a perspective view showing a state before attaching or after detaching the reaction promotion unit cover.
Figure 5:
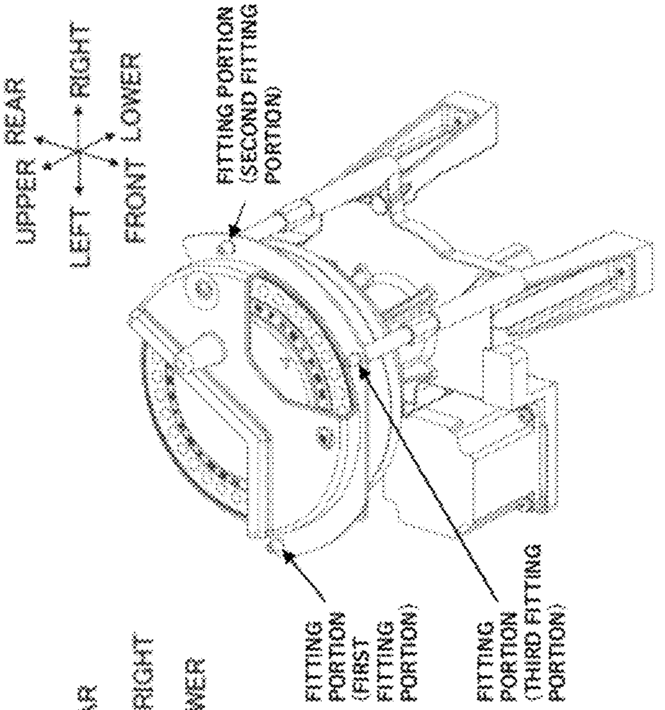
FIG. 5 is a perspective view showing a state in which the reaction promotion unit cover is mounted.

FIG. 4 is a perspective view showing a state before attaching or after detaching the reaction promotion unit cover 16 to or from the reaction promotion unit 8, and FIG. 5 is a perspective view showing a state in which the reaction promotion unit cover 16 is mounted on the reaction promotion unit 8. In a case of attaching the reaction promotion unit cover 16, the inclined portion 3031 having a small diameter at a tip of the rod-like member 30 serves as a guide, and thus the holes (the first hole 17*a*, the second hole 17*b*, and the third hole 17$c$) are easily inserted into the convex portions 303. Here, the diameter of each hole is larger than a diameter of the small cylindrical portion 3032 but smaller than a diameter of the large cylindrical portion 301. Therefore, in a case of inserting each hole into the convex portion 303, the edge portion 162 of the reaction promotion unit cover 16 comes into contact with the seating surface 302 of the rod-like member 30. Accordingly, the reaction promotion unit cover 16 according to the present embodiment is stably supported by the three rod-like members 30.

Further, in the present embodiment, since a difference between the area of the first hole 17$a$ and a cross-sectional area of the small cylindrical portion 3032 of the first rod-like member 30$a$ and a difference between the area of the second hole 17$b$ and a cross-sectional area of the small cylindrical portion 3032 of the second rod-like member 30$b$ are small, a function of positioning the reaction promotion unit cover 16 by fitting the hole and the convex portion is achieved. In contrast, since a difference between the area of the third hole 17$c$ and a cross-sectional area of the small cylindrical portion 3032 of the third rod-like member 30$c$ is larger than that in a case of the first hole 17$a$ and the second hole 17$b$, the function of positioning the reaction promotion unit cover 16 is low.

Here, the handle 18 formed on an upper surface side of the reaction promotion unit cover 16 is positioned between the first hole 17$a$ and the second hole 17$b$ in the left-right direction and on a rear side of the third hole 17$c$ in the front-rear direction. More specifically, the handle 18 is positioned directly behind the third hole 17$c$. Therefore, when the user or the like attaches the reaction promotion unit cover 16 to the reaction promotion unit 8 in a state of gripping the handle 18, the third hole 17$c$ may be hidden by a hand or an arm of the user or the like and may be less likely to be seen. In particular, as shown in FIG. 1, when the third hole 17$c$ is located on a right side of a left end of the consumable providing unit (the consumable conveyance unit 12) in the left-right direction (see a broken line A in FIG. 1), the consumable providing unit is shaded by the user or the like who is in front, and it is difficult to check a position of the third hole 17$c$. Further, when the third hole 17$c$ is located in front of a rear end of the reagent storage unit 4 in the front-rear direction (a broken line B in FIG. 1), the third hole 17$c$ is located further closer to the consumable providing unit, and thus it is more difficult to check the position of the third hole 17$c$. In this way, in the automatic analyzer according to the present embodiment in which the entire layout is made compact, it is not easy to visually observe a front side of the reaction promotion unit cover 16 close to the consumable providing unit (the third hole 17$c$) compared to a reagent storage unit 4 side (the first hole 17$a$) and a rear side (the second hole 17$b$) of the reaction promotion unit cover 16.

However, in the present embodiment, as described above, the difference between the area of the third hole 17$c$ and the cross-sectional area of the small cylindrical portion 3032 of the third rod-like member 30$c$ is larger than that in the case of the first hole 17$a$ and the second hole 17$b$, it is easy to fit the hole into the convex portion. Accordingly, it is possible not only to improve attachment workability of the reaction promotion unit cover 16 by a user or the like during maintenance, but also to prevent water or dust from entering the reaction container in the reaction promotion unit 8 through a gap generated due to displacement of the reaction promotion unit cover 16.

The invention is not limited to the above embodiment, and includes various modifications. For example, although the reagent storage unit 4 is arranged on the left side and the consumable providing unit is arranged on the right side in the above embodiment, the entire layout of the automatic analyzer may be reversed in the left-right direction. Further, the above embodiment includes a layout in which the third hole 17$c$ is located on the rear side of the consumable providing unit and is difficult to be checked, and it is also effective in a case of a layout in which the third hole 17$c$ is located on a rear side of another unit and is difficult to be checked. For example, a layout is conceivable in which the measurement unit 9 is located between the reagent storage unit 4 and the consumable providing unit in the left-right direction and on a front side of the reaction promotion unit 8 in the front-rear direction. In this case, a configuration of a third hole which is located on the rear side of the measurement unit 9 and is difficult to be checked is set as described above, and thus attachment of the reaction promotion unit cover 16 is also facilitated.

Further, the above embodiment includes the configuration in which the first hole 17$a$, the second hole 17$b$, and the third hole 17$c$ are provided in the edge portion 162 of the reaction promotion unit cover 16, and a configuration in which a convex portion is provided on the edge portion 162 of the reaction promotion unit cover 16 and fitted into a hole formed around the reaction promotion unit 8 may also be included. Further, a cross-sectional shape of the hole or the convex portion is not limited to a circular shape, and may be an elliptical shape or another shape. The hole is not limited to a through hole, and may be a non-through hole.

Further, in the above embodiment, although all of the rod-like members 30 have the same configuration, a part of the configuration may be different. For example, the cross-sectional area of the small cylindrical portion 3032 of the third rod-like member 30$c$ corresponding to the third hole 17$c$ may be smaller than the cross-sectional areas of the small cylindrical portions 3032 of the first rod-like member 30$a$ and the second rod-like member 30$b$. Accordingly, even when the cross-sectional area of the third hole 17$c$ is the same as the cross-sectional areas of the first hole 17$a$ and the second hole 17$b$, a clearance between the third hole 17$c$ and the small cylindrical portion 3032 can be relatively increased.

Further, in the above embodiment, the number of fitting portions formed by the holes and the convex portions of the reaction promotion unit cover 16 is three in total, and the number may be four or more. In this case, similar to the third hole 17$c$, it is desirable that a fourth hole and subsequent holes have no positioning functionality and are provided between the first hole 17$a$ and the second hole 17$b$ in the left-right direction.

REFERENCE SIGNS LIST

- 1: sample container
- 2: sample conveyance unit
- 3: reagent container
- 4: reagent storage unit
- 5: sample dispensing unit
- 6: reagent dispensing unit
- 7: stirring unit
- 8: reaction promotion unit
- 9: measurement unit
- 10: sample aspiration position
- 11: consumable storage unit
- 12: consumable conveyance unit
- 13: reagent dispensing probe cleaning unit
- 14: stirring rod cleaning unit

15: control device
16: reaction promotion unit cover
17*a*: first hole
17*b*: second hole
17*c*: third hole
18: handle
19: hole for consumable conveyance
20: hole for reagent dispensation
21: hole for sample dispensation
22: notch for measurement unit
30: rod-like member
30*a*: first rod-like member
30*b*: second rod-like member
30*c*: third rod-like member
301: large cylindrical portion
302: seating surface
303: convex portion
3031: inclined portion
3032: small cylindrical portion

The invention claimed is:

1. An analyzer comprising:

a reagent storage unit that stores a reagent container in which a reagent is accommodated;

a reaction promotion unit that comprises the reaction container with the reagent and a dispensed sample and maintains the reaction container at a predetermined temperature range; and an unused container providing unit that stores an unused reaction container to be conveyed to the reaction promotion unit, wherein the reagent storage unit and the unused container providing unit are arranged on a left side and a right side of the analyzer, respectively, in a left-right direction, wherein a central position of the reaction promotion unit is located between a central position of the reagent storage unit and a central position of the unused container providing unit in the left-right direction of the analyzer, and is located on a rear side from the central position of the reagent storage unit and the central position of the unused container providing unit in a front-rear direction of the analyzer, wherein a cover covering above the reaction promotion unit is provided with a fitting portion comprising a hole and a rod-shape member, and a handle formed on an upper surface side of the cover, wherein a convex portion of the rod-shape member extends upward from a lower side of the reaction promotion unit to an upper side thereof and inserts into the hole, wherein the fitting portion includes at least a first fitting portion located on one side, a second fitting portion located on the other side, and a third fitting portion located between the first fitting portion and the second fitting portion in the left-right direction of the analyzer, wherein the first fitting portion comprises a first hole and a first rod-shape member, the second fitting portion comprises a second hole and a second rod-shape member, the third fitting portion comprises a third hole and a third rod-shape member, wherein the handle is positioned between the first fitting portion and the second fitting portion in the left-right direction and on a rear side of the third fitting portion in the front-rear direction, and wherein the first fitting portion and the second fitting portion are higher in position compared to the third fitting portion which is lower in position.

2. The analyzer according to claim 1, wherein a difference between an area of the third hole of the third fitting portion and a cross-sectional area of a convex portion of the third rod-shape member inserted into the third hole is larger than a difference between an area of the first hole of the first fitting portion and a cross-sectional area of a convex portion of the first rod-shape member inserted into the first hole and a difference between an area of the second hole of the second fitting portion and a cross-sectional area of a convex portion of the second rod-shape member inserted into the second hole.

3. The analyzer according to claim 2, wherein the cross-sectional areas of the convex portion of the first rod-shape member, the convex portion of the second rod-shape member, the convex portion of the third rod-shape member are the same, and wherein the area of the third hole is larger than each of the areas of the first hole and the second hole.

4. The analyzer according to claim 1, wherein the handle and the third fitting portion are located closer to the other side than one end of the unused container providing unit in the left-right direction.

5. The analyzer according claim 4, to wherein the third fitting portion is located closer to a front side than a rear end of the reagent storage unit in the front-rear direction.

6. The analyzer according to claim 1, wherein the cover is provided with a hole for conveyance for conveying the unused reaction container, and wherein the third fitting portion is positioned on a front side of the hole for conveyance in the front-rear direction within a range of the hole for conveyance in the left-right direction.

* * * * *